US009636895B2

(12) United States Patent
Blackwell et al.

(10) Patent No.: US 9,636,895 B2
(45) Date of Patent: May 2, 2017

(54) MULTILAYERED POLYMERIC FILM FOR HOT MELT ADHESIVE LABELING AND LABEL STOCK AND LABEL THEREOF

(75) Inventors: Christopher J. Blackwell, Garrettsville, OH (US); Kevin O. Henderson, Willoughby Hills, OH (US)

(73) Assignee: Avery Dennison Corporation, Glendale, CA (US)

( * ) Notice: Subject to any disclaimer, the term of this patent is extended or adjusted under 35 U.S.C. 154(b) by 410 days.

(21) Appl. No.: 11/994,851

(22) PCT Filed: Jun. 20, 2007

(86) PCT No.: PCT/US2007/071633
§ 371 (c)(1),
(2), (4) Date: Jan. 7, 2008

(87) PCT Pub. No.: WO2007/149900
PCT Pub. Date: Dec. 27, 2007

(65) Prior Publication Data
US 2008/0206505 A1  Aug. 28, 2008

Related U.S. Application Data

(60) Provisional application No. 60/805,231, filed on Jun. 20, 2006.

(51) Int. Cl.
*B32B 7/02* (2006.01)
*B32B 27/08* (2006.01)
(Continued)

(52) U.S. Cl.
CPC ............... *B32B 27/32* (2013.01); *B32B 7/02* (2013.01); *B32B 7/12* (2013.01); *B32B 27/327* (2013.01);
(Continued)

(58) Field of Classification Search
None
See application file for complete search history.

(56) References Cited

U.S. PATENT DOCUMENTS 3,113,986 A   12/1963  Breslow et al.
3,207,735 A    9/1965  Wijga
(Continued)

FOREIGN PATENT DOCUMENTS

CN    1086488    5/1994
CN    1659030    8/2005
(Continued)

OTHER PUBLICATIONS

Machine Translation of JP 2002370328 A, Dec. 2002.*
(Continued)

*Primary Examiner* — Jeff Vonch
(74) *Attorney, Agent, or Firm* — Avery Dennison Corporation

(57) ABSTRACT

A polymeric film for labeling articles comprises a core layer (A), a print skin layer (B) comprising a polypropylene homopolymer, a polypropylene copolymer, a high density polyethylene, or a mixture of any of the foregoing polymers and at least 10% by weight based on the weight of the layer (B) of a polyolefin elastomer, an alkene-unsaturated carboxylic acid or acid derivative copolymer, or a mixture of any of the foregoing polymers, and an adhesive skin layer (C) comprising a polypropylene homopolymer, where the polymeric film is oriented. An adhesive containing label stock and an adhesive label die-cut from the adhesive containing label stock comprise the polymeric film which is especially useful for pressure sensitive hot melt adhesive applications.

23 Claims, 1 Drawing Sheet

(51) Int. Cl.
  *B32B 27/20* (2006.01)
  *B32B 27/32* (2006.01)
  *B32B 7/12* (2006.01)
  *C09J 7/02* (2006.01)
  *G09F 3/10* (2006.01)
  *G09F 3/02* (2006.01)

(52) U.S. Cl.
  CPC .............. *C09J 7/0296* (2013.01); *G09F 3/02* (2013.01); *G09F 3/10* (2013.01); *B32B 27/08* (2013.01); *B32B 27/20* (2013.01); *B32B 2250/03* (2013.01); *B32B 2250/242* (2013.01); *B32B 2250/246* (2013.01); *B32B 2307/516* (2013.01); *B32B 2307/704* (2013.01); *B32B 2307/746* (2013.01); *B32B 2519/00* (2013.01); *C09J 2201/162* (2013.01); *C09J 2203/334* (2013.01); *C09J 2423/046* (2013.01); *C09J 2423/106* (2013.01); *G09F 2003/0241* (2013.01); *Y10S 428/91* (2013.01); *Y10T 428/1476* (2015.01); *Y10T 428/269* (2015.01); *Y10T 428/2813* (2015.01); *Y10T 428/2848* (2015.01); *Y10T 428/31909* (2015.04); *Y10T 428/31913* (2015.04)

(56) References Cited

U.S. PATENT DOCUMENTS

| | | | |
|---|---|---|---|
| 3,207,736 | A | 9/1965 | Wijga |
| 3,207,737 | A | 9/1965 | Wales |
| 3,207,738 | A | 9/1965 | Wijga |
| 3,207,739 | A | 9/1965 | Wales |
| 3,251,905 | A | 5/1966 | Zelinski et al. |
| 3,268,627 | A * | 8/1966 | Emrick ................... C08L 23/10 525/240 |
| 3,390,207 | A | 6/1968 | Moss et al. |
| 3,598,887 | A | 8/1971 | Darcy et al. |
| 3,639,521 | A | 2/1972 | Hsieh |
| 3,853,595 | A * | 12/1974 | Pedginski .............. C09J 7/0275 33/2 R |
| 3,887,745 | A * | 6/1975 | Yoshii .................... C09J 7/0296 156/229 |
| 3,894,904 | A | 7/1975 | Cook |
| 3,963,851 | A * | 6/1976 | Toyoda ...................... C09J 7/04 428/315.5 |
| 4,016,118 | A | 4/1977 | Hamada et al. |
| 4,020,141 | A | 4/1977 | Quinn et al. |
| 4,059,667 | A | 11/1977 | Pangonis |
| 4,124,677 | A | 11/1978 | Saijo et al. |
| 4,188,350 | A | 2/1980 | Vicik et al. |
| 4,205,021 | A | 5/1980 | Morita et al. |
| 4,207,363 | A | 6/1980 | Lustig et al. |
| 4,208,356 | A | 6/1980 | Fukawa et al. |
| 4,219,627 | A | 8/1980 | Halasa et al. |
| 4,226,952 | A | 10/1980 | Halasa et al. |
| 4,314,039 | A | 2/1982 | Kawai et al. |
| 4,340,640 | A | 7/1982 | Weiner |
| 4,371,645 | A | 2/1983 | Mahaffey, Jr. |
| 4,399,180 | A | 8/1983 | Briggs et al. |
| 4,399,181 | A | 8/1983 | Yoshimura et al. |
| 4,405,667 | A | 9/1983 | Christensen et al. |
| 4,407,873 | A | 10/1983 | Christensen et al. |
| 4,407,874 | A | 10/1983 | Gehrke |
| 4,430,377 | A | 2/1984 | Yoshimura et al. |
| 4,434,264 | A | 2/1984 | Ficker |
| 4,447,485 | A * | 5/1984 | Aritake .......................... 428/144 |
| 4,451,533 | A * | 5/1984 | Wong ........................ C08J 5/18 264/214 |
| 4,463,113 | A | 7/1984 | Nakahara et al. |
| 4,508,872 | A | 4/1985 | McCullough, Jr. |
| 4,514,534 | A | 4/1985 | DiNardo |
| 4,522,887 | A | 6/1985 | Koebisu et al. |
| 4,525,416 | A * | 6/1985 | Hammerschmidt .... B32B 27/32 283/108 |
| 4,532,280 | A | 7/1985 | Kobayashi et al. |
| 4,535,125 | A | 8/1985 | McCullough, Jr. |
| 4,551,380 | A | 11/1985 | Schoenberg |
| 4,564,559 | A | 1/1986 | Wagner, Jr. et al. |
| 4,565,738 | A | 1/1986 | Purdy |
| 4,578,316 | A | 3/1986 | Clauson et al. |
| 4,578,429 | A | 3/1986 | Gergen et al. |
| 4,581,262 | A | 4/1986 | Karabedian |
| 4,585,679 | A | 4/1986 | Karabedian |
| 4,588,775 | A | 5/1986 | McCullough, Jr. |
| 4,604,324 | A | 8/1986 | Nahmias et al. |
| 4,605,576 | A | 8/1986 | Jabarin |
| 4,613,547 | A | 9/1986 | Wagner, Jr. et al. |
| 4,613,643 | A | 9/1986 | Nakamura et al. |
| 4,616,470 | A | 10/1986 | Nakamura |
| 4,621,119 | A | 11/1986 | Lu |
| 4,626,574 | A | 12/1986 | Cancio et al. |
| 4,634,735 | A | 1/1987 | Thiersault et al. |
| 4,643,945 | A | 2/1987 | Kiang |
| 4,657,970 | A | 4/1987 | Shiraki et al. |
| 4,659,612 | A * | 4/1987 | Balloni et al. ................. 428/213 |
| 4,663,216 | A | 5/1987 | Toyoda et al. |
| 4,684,578 | A | 8/1987 | Inoue et al. |
| 4,692,489 | A | 9/1987 | Ficker et al. |
| 4,695,503 | A | 9/1987 | Liu et al. |
| 4,704,421 | A | 11/1987 | Teskin |
| 4,713,273 | A | 12/1987 | Freedman |
| 4,716,068 | A * | 12/1987 | Seifried .................. C09J 7/0296 264/176.1 |
| 4,720,427 | A | 1/1988 | Clauson et al. |
| 4,724,185 | A | 2/1988 | Shah |
| 4,728,377 | A | 3/1988 | Gallagher |
| 4,735,335 | A | 4/1988 | Torterotot |
| 4,748,206 | A | 5/1988 | Nogiwa et al. |
| 4,752,597 | A | 6/1988 | Turner |
| 4,769,284 | A | 9/1988 | Kakugo et al. |
| 4,778,697 | A | 10/1988 | Genske et al. |
| 4,790,436 | A | 12/1988 | Nakamura |
| 4,795,782 | A | 1/1989 | Lutz et al. |
| 4,797,235 | A | 1/1989 | Garland et al. |
| 4,798,081 | A | 1/1989 | Hazlitt et al. |
| 4,808,561 | A | 2/1989 | Welborn, Jr. |
| 4,833,024 | A | 5/1989 | Mueller |
| 4,843,129 | A | 6/1989 | Spenadel et al. |
| 4,855,187 | A | 8/1989 | Osgood, Jr. et al. |
| 4,865,908 | A | 9/1989 | Liu et al. |
| 4,880,422 | A | 11/1989 | McBride |
| 4,906,315 | A | 3/1990 | McGrew |
| 4,913,858 | A | 4/1990 | Miekka et al. |
| 4,933,120 | A | 6/1990 | D'Amato et al. |
| 4,937,299 | A | 6/1990 | Ewen et al. |
| 4,956,232 | A | 9/1990 | Balloni et al. |
| 4,957,790 | A | 9/1990 | Warren |
| 4,966,795 | A | 10/1990 | Genske et al. |
| 4,988,465 | A | 1/1991 | Lustig et al. |
| 5,003,915 | A | 4/1991 | D'Amato et al. |
| 5,026,592 | A | 6/1991 | Janocha et al. |
| 5,026,778 | A | 6/1991 | Fujii et al. |
| 5,028,480 | A | 7/1991 | Dean |
| 5,049,436 | A | 9/1991 | Morgan et al. |
| 5,049,605 | A | 9/1991 | Rekers |
| 5,068,155 | A | 11/1991 | Yamada et al. |
| 5,077,129 | A * | 12/1991 | Schinkel .................. B32B 27/18 428/402 |
| 5,083,850 | A | 1/1992 | Mallik et al. |
| 5,084,558 | A | 1/1992 | Rausch et al. |
| 5,085,816 | A | 2/1992 | McCord |
| 5,089,352 | A | 2/1992 | Garland et al. |
| 5,100,728 | A | 3/1992 | Plamthottam et al. |
| 5,110,671 | A * | 5/1992 | Balloni .................... B32B 27/18 264/176.1 |
| 5,116,548 | A | 5/1992 | Mallik et al. |
| 5,125,529 | A | 6/1992 | Torterotot |
| 5,145,212 | A | 9/1992 | Mallik |
| 5,151,309 | A | 9/1992 | Dollinger |
| 5,164,227 | A | 11/1992 | Miekka et al. |
| 5,164,444 | A | 11/1992 | Bernard |
| 5,175,054 | A * | 12/1992 | Chu ........................... C08J 7/047 264/210.7 |

(56) References Cited

U.S. PATENT DOCUMENTS

| | | | |
|---|---|---|---|
| 5,186,782 A | 2/1993 | Freedman | |
| 5,190,609 A | 3/1993 | Lin et al. | |
| 5,194,324 A * | 3/1993 | Poirier | B32B 27/32 428/315.5 |
| 5,206,075 A | 4/1993 | Hodgson, Jr. | |
| 5,212,246 A | 5/1993 | Ogale | |
| 5,213,744 A * | 5/1993 | Bossaert | 264/173.19 |
| 5,217,812 A | 6/1993 | Lee | |
| 5,242,650 A | 9/1993 | Rackovan et al. | |
| 5,250,631 A | 10/1993 | McCullough, Jr. | |
| 5,252,384 A | 10/1993 | Bothe et al. | |
| 5,254,393 A | 10/1993 | Murschall et al. | |
| 5,254,394 A | 10/1993 | Bothe et al. | |
| 5,272,236 A | 12/1993 | Lai et al. | |
| 5,275,886 A | 1/1994 | Chu et al. | |
| 5,278,272 A | 1/1994 | Lai et al. | |
| 5,286,552 A | 2/1994 | Lesca et al. | |
| 5,286,564 A | 2/1994 | Cecchin et al. | |
| 5,288,548 A * | 2/1994 | Weber | 428/315.9 |
| 5,292,561 A | 3/1994 | Peiffer et al. | |
| 5,298,561 A | 3/1994 | Cecchin et al. | |
| 5,300,365 A | 4/1994 | Ogale | |
| 5,316,777 A | 5/1994 | Toyoda et al. | |
| 5,326,639 A | 7/1994 | Leonard et al. | |
| 5,331,047 A | 7/1994 | Giacobbe | |
| 5,332,542 A | 7/1994 | Yamanaka et al. | |
| 5,342,868 A | 8/1994 | Kimura et al. | |
| 5,358,792 A | 10/1994 | Mehta et al. | |
| 5,360,868 A | 11/1994 | Mosier et al. | |
| 5,362,782 A | 11/1994 | McCullough, Jr. et al. | |
| 5,376,417 A | 12/1994 | Amano et al. | |
| 5,380,572 A | 1/1995 | Kotani et al. | |
| 5,380,810 A | 1/1995 | Lai et al. | |
| 5,382,631 A | 1/1995 | Stehling et al. | |
| 5,395,471 A | 3/1995 | Obijeski et al. | |
| 5,407,732 A | 4/1995 | Dokumo | |
| 5,409,992 A | 4/1995 | Eppert, Jr. | |
| 5,414,040 A | 5/1995 | McKay et al. | |
| 5,424,362 A | 6/1995 | Hwang et al. | |
| 5,425,990 A * | 6/1995 | Blum | B29C 55/023 156/244.11 |
| 5,427,807 A | 6/1995 | Chum et al. | |
| 5,435,963 A * | 7/1995 | Rackovan | B29C 49/2408 156/244.11 |
| 5,451,283 A | 9/1995 | Josephy et al. | |
| 5,451,455 A | 9/1995 | Peiffer et al. | |
| 5,453,466 A | 9/1995 | Pellegatti et al. | |
| 5,462,809 A | 10/1995 | Berkowitz | |
| 5,464,690 A | 11/1995 | Boswell | |
| 5,468,440 A | 11/1995 | McAlpin et al. | |
| 5,468,535 A | 11/1995 | Amano et al. | |
| 5,474,820 A | 12/1995 | Murschall et al. | |
| 5,475,075 A | 12/1995 | Brant et al. | |
| 5,476,914 A * | 12/1995 | Ewen | C08F 4/65927 526/160 |
| 5,482,766 A | 1/1996 | Mathavan et al. | |
| 5,482,780 A | 1/1996 | Wilkie et al. | |
| 5,491,019 A | 2/1996 | Kuo | |
| 5,492,757 A | 2/1996 | Schuhmann et al. | |
| 5,496,600 A | 3/1996 | Peiffer et al. | |
| 5,501,905 A * | 3/1996 | Krallmann | B32B 27/32 428/339 |
| 5,503,923 A | 4/1996 | Goto et al. | |
| 5,508,090 A | 4/1996 | Peiffer et al. | |
| 5,516,563 A * | 5/1996 | Schumann | B32B 27/32 428/304.4 |
| 5,525,695 A | 6/1996 | Lai et al. | |
| 5,527,601 A * | 6/1996 | Crighton | B32B 27/20 264/177.19 |
| 5,529,843 A | 6/1996 | Dries et al. | |
| 5,530,054 A | 6/1996 | Tse et al. | |
| 5,530,055 A | 6/1996 | Needham | |
| 5,552,482 A | 9/1996 | Berta | |
| 5,560,563 A | 10/1996 | Janson, Jr. et al. | |
| 5,560,885 A | 10/1996 | Murschall et al. | |
| 5,560,997 A * | 10/1996 | Kotani | C08J 5/18 428/195.1 |
| 5,562,958 A | 10/1996 | Walton et al. | |
| 5,573,723 A | 11/1996 | Peiffer et al. | |
| 5,582,889 A | 12/1996 | Pedrini | |
| 5,582,923 A | 12/1996 | Kale et al. | |
| 5,585,193 A | 12/1996 | Josephy et al. | |
| 5,591,390 A | 1/1997 | Walton et al. | |
| 5,594,070 A | 1/1997 | Jacoby et al. | |
| 5,595,705 A | 1/1997 | Walton et al. | |
| 5,611,980 A | 3/1997 | Eto et al. | |
| 5,611,982 A | 3/1997 | Mathavan et al. | |
| 5,639,811 A | 6/1997 | Plamthottam et al. | |
| 5,641,848 A | 6/1997 | Giacobbe et al. | |
| 5,643,678 A | 7/1997 | Boswell | |
| 5,662,985 A * | 9/1997 | Jensen | B32B 27/08 428/195.1 |
| 5,665,800 A | 9/1997 | Lai et al. | |
| 5,670,003 A | 9/1997 | Boswell | |
| 5,672,224 A | 9/1997 | Kaufmann | |
| 5,674,342 A | 10/1997 | Obijeski et al. | |
| 5,674,580 A | 10/1997 | Boswell | |
| 5,674,630 A | 10/1997 | Chatterjee | |
| 5,677,383 A | 10/1997 | Chum et al. | |
| 5,685,128 A | 11/1997 | Chum et al. | |
| 5,691,043 A | 11/1997 | Keller et al. | |
| 5,709,937 A * | 1/1998 | Adams | B32B 27/32 428/332 |
| 5,711,839 A | 1/1998 | Dronzek et al. | |
| 5,712,031 A | 1/1998 | Kelch et al. | |
| 5,716,669 A | 2/1998 | LaRose et al. | |
| 5,747,192 A | 5/1998 | Hughen et al. | |
| 5,747,594 A | 5/1998 | deGroot et al. | |
| 5,753,349 A | 5/1998 | Boswell | |
| 5,756,169 A | 5/1998 | Peiffer et al. | |
| 5,759,648 A | 6/1998 | Idlas | |
| 5,759,683 A | 6/1998 | Boswell | |
| 5,773,155 A | 6/1998 | Kale et al. | |
| 5,783,017 A | 7/1998 | Boswell | |
| 5,783,638 A | 7/1998 | Lai et al. | |
| 5,792,549 A | 8/1998 | Wilkie | |
| 5,810,957 A | 9/1998 | Boswell | |
| 5,844,045 A | 12/1998 | Kolthammer et al. | |
| 5,847,053 A | 12/1998 | Chum et al. | |
| 5,849,419 A * | 12/1998 | Josephy | B29C 55/023 428/220 |
| 5,852,152 A | 12/1998 | Walton et al. | |
| 5,863,665 A | 1/1999 | Kale et al. | |
| 5,863,834 A | 1/1999 | Kawaguchi et al. | |
| 5,869,575 A | 2/1999 | Kolthammer et al. | |
| 5,874,139 A | 2/1999 | Bosiers et al. | |
| 5,882,749 A | 3/1999 | Jones et al. | |
| 5,885,699 A | 3/1999 | Watson et al. | |
| 5,885,707 A | 3/1999 | Kaschel et al. | |
| 5,885,721 A * | 3/1999 | Su | B29C 55/023 264/280 |
| 5,897,941 A | 4/1999 | Shah | |
| 5,900,294 A | 5/1999 | Murschall et al. | |
| 5,900,310 A | 5/1999 | Murschall et al. | |
| 5,907,942 A | 6/1999 | Eichbauer | |
| 5,922,800 A | 7/1999 | Crotty et al. | |
| 5,932,157 A | 8/1999 | Dries et al. | |
| 5,948,199 A | 9/1999 | McGrew | |
| 5,948,839 A | 9/1999 | Chatterjee | |
| 5,955,205 A | 9/1999 | Ramsey et al. | |
| 5,961,766 A | 10/1999 | Chang et al. | |
| 5,962,092 A | 10/1999 | Kuo et al. | |
| 5,972,443 A | 10/1999 | Breck et al. | |
| 5,972,444 A | 10/1999 | Patel et al. | |
| 5,986,009 A | 11/1999 | Thoen et al. | |
| 5,986,028 A | 11/1999 | Lai et al. | |
| 5,998,017 A | 12/1999 | Eichbauer et al. | |
| 6,007,665 A | 12/1999 | Bourdelais et al. | |
| 6,017,615 A | 1/2000 | Thakker et al. | |
| 6,020,046 A | 2/2000 | Abhau | |
| 6,026,953 A | 2/2000 | Nakamura et al. | |
| 6,033,514 A | 3/2000 | Davis et al. | |
| 6,042,930 A | 3/2000 | Kelch et al. | |

(56) References Cited

U.S. PATENT DOCUMENTS

| | | |
|---|---|---|
| 6,051,305 A | 4/2000 | Hsu |
| 6,060,567 A | 5/2000 | Lai et al. |
| 6,072,005 A | 6/2000 | Kobylivker et al. |
| 6,074,762 A | 6/2000 | Cretekos et al. |
| 6,083,611 A | 7/2000 | Eichbauer et al. |
| 6,093,464 A | 7/2000 | Tokunaga et al. |
| 6,093,480 A | 7/2000 | Eichbauer |
| 6,094,889 A | 8/2000 | Van Loon et al. |
| 6,096,014 A | 8/2000 | Haffner et al. |
| 6,111,023 A | 8/2000 | Chum et al. |
| 6,111,102 A | 8/2000 | Schlegel |
| 6,113,271 A | 9/2000 | Scott |
| 6,127,043 A | 10/2000 | Lange |
| 6,136,439 A | 10/2000 | Coburn |
| 6,136,937 A | 10/2000 | Lai et al. |
| 6,140,442 A | 10/2000 | Knight et al. |
| 6,165,599 A * | 12/2000 | Demeuse ............... B32B 27/32 428/213 |
| 6,165,609 A | 12/2000 | Curatolo |
| 6,180,720 B1 | 1/2001 | Collina et al. |
| 6,183,856 B1 | 2/2001 | Amon |
| 6,194,532 B1 | 2/2001 | Maugans et al. |
| 6,197,886 B1 | 3/2001 | Chatterjee et al. |
| 6,204,330 B1 | 3/2001 | Braga et al. |
| 6,204,335 B1 | 3/2001 | Somers |
| 6,214,443 B1 | 4/2001 | Palmasi et al. |
| 6,214,447 B1 | 4/2001 | Nakagawa et al. |
| 6,214,935 B1 | 4/2001 | Sasaki et al. |
| 6,231,936 B1 | 5/2001 | Kozimor et al. |
| 6,231,975 B1 | 5/2001 | Kong et al. |
| 6,235,818 B1 | 5/2001 | Morizono et al. |
| 6,245,857 B1 * | 6/2001 | Shamshoum ............... C08J 5/18 428/516 |
| 6,248,851 B1 | 6/2001 | Maugans et al. |
| 6,268,062 B1 * | 7/2001 | DeMeuse ............... B32B 27/32 428/349 |
| 6,287,684 B1 | 9/2001 | Yamanaka et al. |
| 6,288,168 B1 | 9/2001 | Shiromoto et al. |
| 6,290,261 B1 | 9/2001 | Waggoner et al. |
| 6,299,984 B1 | 10/2001 | Forloni |
| 6,300,415 B1 | 10/2001 | Okayama et al. |
| 6,300,419 B1 | 10/2001 | Sehanobish et al. |
| 6,303,233 B1 * | 10/2001 | Amon et al. ............... 428/516 |
| 6,306,518 B1 | 10/2001 | Shah et al. |
| 6,316,549 B1 | 11/2001 | Chum et al. |
| 6,319,945 B1 | 11/2001 | Parks |
| 6,322,883 B1 | 11/2001 | Williams |
| 6,329,454 B1 | 12/2001 | Krabbenborg |
| 6,333,096 B1 | 12/2001 | Rodgers et al. |
| 6,340,532 B1 | 1/2002 | Huang et al. |
| 6,342,564 B1 | 1/2002 | Pitkanen et al. |
| 6,342,566 B2 | 1/2002 | Burkhardt et al. |
| 6,344,250 B1 | 2/2002 | Arthurs |
| 6,348,555 B1 | 2/2002 | Lai et al. |
| 6,362,270 B1 | 3/2002 | Chaudhary et al. |
| 6,364,988 B1 | 4/2002 | Lin |
| 6,365,682 B1 | 4/2002 | Alastalo et al. |
| 6,368,545 B1 | 4/2002 | Bailey et al. |
| 6,376,058 B1 | 4/2002 | Schut et al. |
| 6,379,605 B1 | 4/2002 | Lin |
| 6,384,123 B1 | 5/2002 | Young |
| 6,384,138 B1 | 5/2002 | Jacob et al. |
| 6,384,142 B1 | 5/2002 | Burkhardt et al. |
| 6,387,529 B1 * | 5/2002 | Peet ............... B29C 55/023 428/516 |
| 6,391,425 B1 | 5/2002 | Migliorini et al. |
| 6,410,648 B1 | 6/2002 | Sasaki et al. |
| 6,423,420 B1 | 7/2002 | Brant et al. |
| 6,436,496 B1 * | 8/2002 | Rackovan et al. ............ 428/34.9 |
| 6,436,531 B1 | 8/2002 | Kollaja et al. |
| 6,436,534 B1 | 8/2002 | Knight et al. |
| 6,440,533 B1 | 8/2002 | Ray et al. |
| 6,441,094 B1 | 8/2002 | Cecchin et al. |
| 6,444,301 B1 * | 9/2002 | Davidson ............... B32B 27/20 156/244.11 |
| 6,448,355 B1 | 9/2002 | Knight et al. |
| 6,451,426 B2 | 9/2002 | Kong et al. |
| 6,455,150 B1 * | 9/2002 | Sheppard ............... B32B 27/32 156/244.11 |
| 6,455,171 B2 | 9/2002 | Scheibelhoffer et al. |
| 6,455,643 B1 | 9/2002 | Harlin et al. |
| 6,461,555 B1 | 10/2002 | Freedman |
| 6,461,706 B1 * | 10/2002 | Freedman ............... B32B 27/32 428/220 |
| 6,469,110 B1 | 10/2002 | Harlin et al. |
| 6,472,077 B1 | 10/2002 | Cretekos et al. |
| 6,472,474 B2 | 10/2002 | Burkhardt et al. |
| 6,486,284 B1 | 11/2002 | Karande et al. |
| 6,489,019 B1 | 12/2002 | Shah et al. |
| 6,495,266 B1 | 12/2002 | Migliorini |
| 6,500,563 B1 | 12/2002 | Datta et al. |
| 6,500,901 B2 | 12/2002 | Somers et al. |
| 6,503,619 B1 | 1/2003 | Neal et al. |
| 6,503,635 B1 | 1/2003 | Kong et al. |
| 6,503,637 B1 | 1/2003 | Van Loon |
| 6,506,867 B1 | 1/2003 | Lai et al. |
| 6,511,755 B1 | 1/2003 | Mochizuki et al. |
| 6,515,093 B1 | 2/2003 | Somers |
| 6,518,377 B1 * | 2/2003 | Shamshoum ............ C08F 10/06 525/191 |
| 6,534,612 B1 | 3/2003 | Lai et al. |
| 6,548,611 B2 | 4/2003 | Lai et al. |
| 6,552,149 B2 | 4/2003 | Alastalo et al. |
| 6,566,446 B1 | 5/2003 | Parikh et al. |
| 6,566,450 B2 | 5/2003 | Debras et al. |
| 6,576,306 B2 | 6/2003 | Mehta et al. |
| 6,576,329 B2 | 6/2003 | Kong |
| 6,583,209 B2 | 6/2003 | Mehta et al. |
| 6,583,227 B2 | 6/2003 | Mehta et al. |
| 6,610,792 B2 | 8/2003 | Albe et al. |
| 6,623,866 B2 | 9/2003 | Migliorini et al. |
| 6,638,637 B2 | 10/2003 | Hager et al. |
| 6,642,290 B1 * | 11/2003 | Dotson ............... C08K 5/098 524/108 |
| 6,663,947 B2 | 12/2003 | Freedman et al. |
| 6,703,134 B1 * | 3/2004 | Parr et al. ............... 428/461 |
| 6,703,447 B2 * | 3/2004 | Coburn ............... 525/291 |
| 6,706,342 B2 * | 3/2004 | Kong ............... B32B 27/32 206/459.5 |
| 6,716,501 B2 | 4/2004 | Kovalchuk et al. |
| 6,723,829 B1 | 4/2004 | Malm et al. |
| 6,734,256 B1 | 5/2004 | Everaerts et al. |
| 6,765,068 B2 | 7/2004 | Albe et al. |
| 6,780,936 B1 | 8/2004 | Agarwal et al. |
| 6,787,217 B2 | 9/2004 | Squier et al. |
| 6,790,516 B2 | 9/2004 | Niepelt |
| 6,803,421 B2 | 10/2004 | Joseph |
| 6,808,822 B2 | 10/2004 | Rajan et al. |
| 6,821,592 B2 | 11/2004 | Rodick |
| 6,828,019 B2 | 12/2004 | Kong et al. |
| 6,835,462 B2 | 12/2004 | Sun et al. |
| 6,844,079 B2 * | 1/2005 | Holzer ............... B29C 55/023 156/308.2 |
| 6,872,462 B2 | 3/2005 | Roberts et al. |
| 6,881,793 B2 | 4/2005 | Sheldon et al. |
| 6,887,582 B2 | 5/2005 | Lee et al. |
| 6,908,687 B2 * | 6/2005 | Mendes ............... B32B 27/32 428/334 |
| 6,919,113 B2 * | 7/2005 | Therrian ............... B29C 55/023 156/244.11 |
| 6,919,407 B2 | 7/2005 | Tau et al. |
| 6,939,602 B2 | 9/2005 | McGee et al. |
| 6,946,535 B2 | 9/2005 | Tau et al. |
| 6,982,311 B2 | 1/2006 | Karande et al. |
| 6,991,261 B2 | 1/2006 | Dronzek et al. |
| 6,994,915 B2 | 2/2006 | Pelliconi et al. |
| 6,995,213 B2 | 2/2006 | Miller et al. |
| 7,041,765 B2 | 5/2006 | Tau et al. |
| 7,165,888 B2 | 1/2007 | Rodick |
| 7,186,366 B2 | 3/2007 | Schwinn |
| 7,217,463 B2 | 5/2007 | Henderson |

(56) References Cited

U.S. PATENT DOCUMENTS

| | | |
|---|---|---|
| 7,217,767 B2 | 5/2007 | Aguirre et al. |
| 7,309,742 B2 | 12/2007 | Poncelet et al. |
| 7,410,706 B2 | 8/2008 | Rodick |
| 7,449,522 B2 | 11/2008 | Aguirre et al. |
| 7,655,317 B2 | 2/2010 | Brant et al. |
| 7,700,189 B2 | 4/2010 | Amon et al. |
| 7,722,960 B2 | 5/2010 | Mills et al. |
| 7,754,814 B2 | 7/2010 | Barcus et al. |
| 7,794,848 B2 | 9/2010 | Breese |
| 7,842,365 B2 | 11/2010 | Riggs |
| 7,927,712 B2 | 4/2011 | Mills et al. |
| 7,951,462 B2 * | 5/2011 | English .................... D02G 3/06 428/397 |
| 7,963,413 B2 | 6/2011 | Sierra-Gomez et al. |
| 8,012,558 B2 | 9/2011 | Behrens |
| 8,105,686 B2 | 1/2012 | Blackwell et al. |
| 8,181,783 B2 | 5/2012 | Kakura et al. |
| 8,182,891 B2 | 5/2012 | Scott et al. |
| 8,709,610 B2 | 4/2014 | Yun et al. |
| 2001/0018125 A1 | 8/2001 | Shibuya et al. |
| 2001/0029232 A1 * | 10/2001 | Eisen ...................... C08F 10/00 502/103 |
| 2001/0039314 A1 | 11/2001 | Mehta et al. |
| 2001/0041776 A1 | 11/2001 | Lai et al. |
| 2001/0044506 A1 | 11/2001 | Mehta et al. |
| 2001/0051265 A1 * | 12/2001 | Williams ............. B41M 5/0256 428/343 |
| 2001/0055692 A1 * | 12/2001 | Heffelfinger ........... B32B 27/32 428/516 |
| 2002/0006498 A1 | 1/2002 | Migliorini et al. |
| 2002/0006520 A1 | 1/2002 | Rasp et al. |
| 2002/0028340 A1 | 3/2002 | Fujii et al. |
| 2002/0037969 A1 * | 3/2002 | Schut ...................... C08L 23/08 525/227 |
| 2002/0050319 A1 * | 5/2002 | Nishizawa ............. B32B 27/18 156/245 |
| 2002/0064646 A1 * | 5/2002 | Cretekos ................ B32B 27/32 428/331 |
| 2002/0065384 A1 | 5/2002 | Knight et al. |
| 2002/0098303 A1 * | 7/2002 | Rackovan ............... B32B 27/32 428/34.9 |
| 2002/0146520 A1 * | 10/2002 | Squier ....................... B32B 3/26 428/34.1 |
| 2002/0155283 A1 * | 10/2002 | Carter et al. ................ 428/343 |
| 2002/0160170 A1 | 10/2002 | Ishige et al. |
| 2002/0182390 A1 * | 12/2002 | Migliorini ............... B32B 27/08 428/216 |
| 2002/0192466 A1 * | 12/2002 | Lu .......................... 428/355 AC |
| 2003/0008082 A1 | 1/2003 | Dronzek et al. |
| 2003/0021930 A1 * | 1/2003 | Mientus ............... B29C 47/0021 428/40.1 |
| 2003/0049436 A1 * | 3/2003 | Hager ..................... B32B 27/32 428/343 |
| 2003/0049476 A1 * | 3/2003 | Su ......................... B32B 27/32 428/515 |
| 2003/0072957 A1 | 4/2003 | Lee et al. |
| 2003/0078357 A1 | 4/2003 | Lai et al. |
| 2003/0087114 A1 | 5/2003 | Ferri et al. |
| 2003/0099792 A1 | 5/2003 | Andersson et al. |
| 2003/0113535 A1 * | 6/2003 | Sun et al. ................... 428/354 |
| 2003/0114579 A1 | 6/2003 | Mori et al. |
| 2003/0134062 A1 * | 7/2003 | Rajan et al. ................ 428/34.9 |
| 2003/0143357 A1 | 7/2003 | Frauenhofer |
| 2003/0148132 A1 * | 8/2003 | Schwinn ................. B32B 27/32 428/515 |
| 2003/0157313 A1 | 8/2003 | Shibuya et al. |
| 2003/0176603 A1 | 9/2003 | Ommundsen et al. |
| 2003/0180490 A1 * | 9/2003 | Squier ........................ 428/35.7 |
| 2003/0203230 A1 | 10/2003 | Pellingra et al. |
| 2003/0207137 A1 | 11/2003 | Kong et al. |
| 2003/0207138 A1 * | 11/2003 | Kong et al. ................. 428/515 |
| 2003/0211298 A1 * | 11/2003 | Migliorini ............... B32B 27/18 428/195.1 |
| 2004/0013870 A1 | 1/2004 | Sheldon et al. |
| 2004/0023052 A1 * | 2/2004 | Ambroise ............... B32B 27/20 428/515 |
| 2004/0033349 A1 * | 2/2004 | Henderson ................. 428/304.4 |
| 2004/0050479 A1 | 3/2004 | McEwen et al. |
| 2004/0072004 A1 * | 4/2004 | Migliorini ............... B32B 27/08 428/523 |
| 2004/0081776 A1 * | 4/2004 | Squier ....................... B32B 7/10 428/34.1 |
| 2004/0110019 A1 | 6/2004 | Schubert et al. |
| 2004/0126518 A1 * | 7/2004 | Mendes et al. ............... 428/34.8 |
| 2004/0127614 A1 * | 7/2004 | Jiang ........................ C08F 10/00 524/270 |
| 2004/0197572 A1 * | 10/2004 | Bell ........................ C08J 7/047 428/424.8 |
| 2004/0224175 A1 * | 11/2004 | Henderson ............ B29C 55/023 428/515 |
| 2005/0031824 A1 | 2/2005 | Rodick |
| 2005/0037191 A1 | 2/2005 | Ikenoya |
| 2005/0048303 A1 * | 3/2005 | Henderson ............. B32B 27/32 428/516 |
| 2005/0069723 A1 | 3/2005 | Miller et al. |
| 2005/0113524 A1 * | 5/2005 | Stevens ................. B32B 27/32 525/240 |
| 2005/0129811 A1 | 6/2005 | Kraimer et al. |
| 2005/0167026 A1 | 8/2005 | Dronzek et al. |
| 2005/0214558 A1 | 9/2005 | Rodick |
| 2005/0234172 A1 | 10/2005 | Musgrave |
| 2005/0276525 A1 | 12/2005 | Hebert |
| 2005/0287359 A1 | 12/2005 | Breese |
| 2006/0008666 A1 | 1/2006 | Miller et al. |
| 2006/0009586 A1 | 1/2006 | Aguirre et al. |
| 2006/0024518 A1 | 2/2006 | Kong et al. |
| 2006/0024520 A1 | 2/2006 | Kong et al. |
| 2006/0040100 A1 | 2/2006 | Nemoto et al. |
| 2006/0057410 A1 | 3/2006 | Saavedra et al. |
| 2006/0147663 A1 | 7/2006 | Barre et al. |
| 2006/0251342 A1 | 11/2006 | Forman |
| 2006/0258811 A1 | 11/2006 | Barcus et al. |
| 2006/0293424 A1 * | 12/2006 | Tse ........................ C08F 255/02 524/270 |
| 2007/0059545 A1 | 3/2007 | Emiliani et al. |
| 2007/0142801 A1 * | 6/2007 | Zhou ..................... C09J 123/02 604/366 |
| 2008/0020191 A1 * | 1/2008 | Mussig ................. C08K 5/0083 428/220 |
| 2008/0134642 A1 | 6/2008 | Brown et al. |
| 2008/0199647 A1 * | 8/2008 | Blackwell ............. B32B 27/32 428/41.8 |
| 2009/0068486 A1 | 3/2009 | Blackwell et al. |
| 2009/0110944 A1 | 4/2009 | Aguirre et al. |
| 2009/0130360 A1 | 5/2009 | Damman et al. |
| 2009/0155614 A1 | 6/2009 | McLeod et al. |
| 2009/0220757 A1 | 9/2009 | Patel et al. |
| 2010/0002963 A1 | 1/2010 | Holbert et al. |
| 2010/0055429 A1 * | 3/2010 | Lee ............................ C08J 5/18 428/213 |
| 2010/0300616 A1 | 12/2010 | Mitchell |
| 2010/0323134 A1 | 12/2010 | Bostian et al. |
| 2011/0039151 A1 | 2/2011 | Mitchell |
| 2011/0123743 A1 | 5/2011 | Cruz et al. |
| 2011/0163100 A1 | 7/2011 | Ueda |
| 2011/0177326 A1 | 7/2011 | Mitchell |
| 2012/0040197 A1 | 2/2012 | Suzuki et al. |
| 2012/0060997 A1 | 3/2012 | Mitchell et al. |
| 2012/0189830 A1 | 7/2012 | Niepelt et al. |
| 2012/0196102 A1 | 8/2012 | Cortes |
| 2013/0320019 A1 | 12/2013 | Tinoco |
| 2014/0205847 A1 | 7/2014 | Falla |
| 2014/0248480 A1 | 9/2014 | Vinck et al. |
| 2015/0151885 A1 | 6/2015 | Nakano |
| 2015/0190988 A1 | 7/2015 | Saxberg et al. |

FOREIGN PATENT DOCUMENTS

| | | |
|---|---|---|
| CN | 1720170 | 1/2006 |
| CN | 101489786 | 7/2009 |
| CN | 1533342 | 9/2009 |
| CN | 102083619 | 6/2011 |

(56) References Cited

FOREIGN PATENT DOCUMENTS

| | | | |
|---|---|---|---|
| CN | 102137797 | 7/2011 | |
| CN | 101239666 | 12/2011 | |
| CN | 102596567 | 7/2012 | |
| DE | 3710670 A1 * | 10/1987 | ............ B32B 27/08 |
| DE | 101 47 538 A1 | 4/2003 | |
| EP | 0185454 | 11/1980 | |
| EP | 0029368 | 5/1981 | |
| EP | 0122495 | 5/1989 | |
| EP | 0341091 | 11/1989 | |
| EP | 0377289 | 7/1990 | |
| EP | 0416379 | 8/1990 | |
| EP | 0119314 | 6/1991 | |
| EP | 0444671 | 9/1991 | |
| EP | 0619827 | 6/1993 | |
| EP | 0477662 | 2/1995 | |
| EP | 0688007 | 12/1995 | |
| EP | 0569621 | 1/1996 | |
| EP | 0373660 | 2/1996 | |
| EP | 0575465 | 4/1997 | |
| EP | 0608369 | 5/1997 | |
| EP | 0416815 | 8/1997 | |
| EP | 0457082 | 11/1997 | |
| EP | 0830248 | 3/1998 | |
| EP | 0677832 | 6/1998 | |
| EP | 0696300 | 12/1998 | |
| EP | 0887381 | 12/1998 | |
| EP | 0783006 | 1/1999 | |
| EP | 0640649 | 3/1999 | |
| EP | 0706448 | 7/1999 | |
| EP | 0 950 511 A2 | 10/1999 | |
| EP | 0950511 | 10/1999 | |
| EP | 0899278 | 11/1999 | |
| EP | 0899279 | 11/1999 | |
| EP | 0956947 | 11/1999 | |
| EP | 0589213 | 1/2000 | |
| EP | 0681592 | 8/2000 | |
| EP | 0472946 | 10/2000 | |
| EP | 0782589 | 6/2001 | |
| EP | 1116745 | 7/2001 | |
| EP | 1244743 | 10/2002 | |
| EP | 1283242 | 2/2003 | |
| EP | 0787167 | 5/2003 | |
| EP | 0831994 | 8/2003 | |
| EP | 0991679 | 11/2003 | |
| EP | 1044995 | 11/2003 | |
| EP | 0991719 | 12/2003 | |
| EP | 1 376 516 A1 | 1/2004 | |
| EP | 0887380 | 2/2004 | |
| EP | 1409360 | 4/2004 | |
| EP | 0991684 | 1/2006 | |
| EP | 1719712 | 11/2006 | |
| EP | 1813423 | 8/2007 | |
| EP | 0863183 | 5/2008 | |
| EP | 1775122 | 7/2009 | |
| EP | 1886934 | 6/2010 | |
| EP | 2323921 | 4/2013 | |
| GB | 1171219 | 10/1968 | |
| JP | 52-109580 | 9/1977 | |
| JP | 52126487 A * | 10/1977 | |
| JP | 54-130295 | 10/1979 | |
| JP | 60-178132 | 9/1985 | |
| JP | 62-056117 | 3/1987 | |
| JP | 62-121709 | 6/1987 | |
| JP | 08099353 A * | 4/1996 | |
| JP | 11198310 A * | 7/1999 | |
| JP | 2002-037311 | 2/2002 | |
| JP | 2002370328 A * | 12/2002 | ............ B32B 27/32 |
| JP | 2003-137314 | 5/2003 | |
| JP | 2004114610 A * | 4/2004 | |
| JP | 2004-182310 | 7/2004 | |
| JP | 2005-281599 | 10/2005 | |
| JP | 2006326890 A * | 12/2006 | |
| JP | 2008-063004 | 3/2008 | |
| JP | 2011-526867 | 10/2010 | |
| WO | 90/00788 | 1/1990 | |
| WO | 9003414 | 4/1990 | |
| WO | 92/06836 | 4/1992 | |
| WO | 93/03093 | 2/1993 | |
| WO | 93/03695 | 3/1993 | |
| WO | 93/10007 | 5/1993 | |
| WO | 9313143 | 7/1993 | |
| WO | 9409060 | 4/1994 | |
| WO | 95/01397 | 1/1995 | |
| WO | 95/26268 | 10/1995 | |
| WO | 95/32242 | 11/1995 | |
| WO | 96/21557 | 7/1996 | |
| WO | 97/01440 | 1/1997 | |
| WO | 97/08238 | 3/1997 | |
| WO | 98/01285 | 1/1998 | |
| WO | 98/59002 | 12/1998 | |
| WO | 00/13888 | 3/2000 | |
| WO | 00/58090 | 10/2000 | |
| WO | 01/03922 | 1/2001 | |
| WO | 01/17775 | 3/2001 | |
| WO | 01/46314 | 6/2001 | |
| WO | 01/70484 | 9/2001 | |
| WO | 02/11983 | 2/2002 | |
| WO | 02/084343 | 10/2002 | |
| WO | 03/011584 | 2/2003 | |
| WO | 03/014219 | 2/2003 | |
| WO | 03/018312 | 3/2003 | |
| WO | 03/033262 | 4/2003 | |
| WO | 03/093003 | 11/2003 | |
| WO | 03/093004 | 11/2003 | |
| WO | 03/106514 | 12/2003 | |
| WO | 2004/003874 | 1/2004 | |
| WO | 2004/009348 | 1/2004 | |
| WO | 2004/055101 | 7/2004 | |
| WO | 2004/094129 | 11/2004 | |
| WO | 2005/040270 | 5/2005 | |
| WO | 2005/097492 | 10/2005 | |
| WO | 2006/022973 | 3/2006 | |
| WO | 2006/031435 | 3/2006 | |
| WO | 06/43919 | 4/2006 | |
| WO | 2006/062504 | 6/2006 | |
| WO | WO 2007085283 A1 * | 8/2007 | ............ B32B 27/32 |
| WO | 2007/146986 | 12/2007 | |
| WO | 2007/149900 | 12/2007 | |
| WO | 2008/011402 | 1/2008 | |
| WO | 2010/002834 | 1/2010 | |
| WO | 2010/067111 | 6/2010 | |
| WO | 2011/100029 | 8/2011 | |
| WO | 2011/113008 | 9/2011 | |
| WO | 2011/128669 | 10/2011 | |
| WO | 2012/106025 | 8/2012 | |

OTHER PUBLICATIONS

Kissin, Yury, Alkene Polymerization Reactions with Transition Metal Catalysts, Mar. 2008.*
Machine Translation of JP 08099353 A, Apr. 1996.*
English Abstract for JP 11198310 A, Jul. 1999.*
International Search Report from corresponding International Application No. PCT/US2007/071633 mailed Dec. 14, 2007.
M. Tanaka; High Value Added Film Using an Olefin Based Elastomer; Specialty Plastics Conference, Zuerich, Dec. 3-4, 1990.
Tafmer(R) "A" -A New Polyolefin Resin with Excellent Flexibility, Mitsui Petrochemical Industries, Jan. 1977 (Mitsui, 1977).
Webpage printout from www.polyrriersdatabasecom for LLDPE printed Jul. 29, 2003, copyright notice 2000, CRC Press, pp. 1-10 (10 pages).
NR. Dharmarajan and T.C. Yu, Modifying Polypropylene with a Metallocene Piastorner, Plastics Engineering, pp. 33-35, Aug. 1996 (3 pages).
Huntsman, product data sheet for P5M4K-046, May 2002 (1 page).
ExxonMobil Chemical, product data sheet for Exact 4151, Oct. 15, 1999(1 page).
Webpage printout from www.polymersdatabase.com for VLDPE printed Jul. 29, 2003, copyright notice 2000, CRC Press, pp. 1-4 (4 pages).
Webpage printout from www.polymersdatabase.com for LDPE printed Jul. 29, 2003, copyright notice 2000, CRC Press, pp. 1-9 (9 pages)

(56) References Cited

OTHER PUBLICATIONS

Webpage printout from www.polymersdatabase.com for MDPE printed Jul. 29, 2003, copyright notice 2000, CRC Press, pp. 1-5 (5 pages).
Webpage printout from www.polymersdatabase.com for Polyethylene, High Density printed Jul. 29, 2003, copyright notice 2000, CRC Press, pp. 1-13 (13 pages).
Webpage printout from www.polymersdatabase.com for Ultra High Molecular Weight PE printed Jul. 29, 2003, copyright notice 2000, CRC Press, pp, 1-6 (6 pages).
Tamfer(R) "P" -A New-Type Elastomer as Plastics Modifying Agent Supplied in Pellet Form, Mitsui Petrochemical Industries, Aug. 1975 (Mitsui, 1975).
"MDO Films: Lots of Promise, Big Challenges," Jan H. Schut, Plastics Technology, Feb. 2005.
"Applications and Advantages of Beta-Crystalline Poiypropylene," Philip Jacoby, Society of Piastics Engineers, Plastics Research Online, 10/2417/spepro.005015, 3 pages, copyright 2013.
International Preliminary Report on Patentabilfty issued in corresponding IA No. PCT/US20071071633 dated Jan. 8, 2009.
International Search Report and Written Opinion issued in corresponding IA No. PCT/US2007/071633 dated Dec. 14, 2007.
Internatonal Seach Report and Written Opinion issued in coresponding IA No. PCT/US2015/033707 dated Aug. 6, 2015.
International Preliminary Report on Patentability issued in corresponding IA No. PCT/US2015/033707 dated Dec. 15, 2016.
International Preliminary Report on Patentability issued in corresponding IA No. PCT/CN2012/080154 dated Feb. 17, 2015.
International Search Report and Written Opinion issued in corresponding IA No. PCT/CN2012/080154 dated May 23, 2013.
International Preliminary Report on Patentability issued in corresponding IA No. PCT/US2013/024003 dated Aug. 14, 2014.
International Search Report issued in corresponding IA No. PCT/US2013/024003 dated Sep. 19, 2013.
Written Opinion mailed May 15, 2006 in corresponding International Application No. PCT/US03/20281.
International Preliminary Report on Patentability issued in corresponding lA No. PCT/US2007/071084 dated Jul. 22, 2008.
International Search Report and Written Opinion issued in corresponding IA No. PCT/US2007/071084 dated Oct. 24, 2007.

* cited by examiner

MULTILAYERED POLYMERIC FILM FOR HOT MELT ADHESIVE LABELING AND LABEL STOCK AND LABEL THEREOF

CROSS-REFERENCES TO RELATED APPLICATIONS

This application is a national phase of International Application No. PCT/US2007/071633, filed Jun. 20, 2007, which claims priority to U.S. Provisional Application Ser. No. 60/805,231, filed Jun. 20, 2006. The entire disclosure of this international application and the entire disclosure of this provisional application are hereby incorporated by reference.

FIELD OF THE INVENTION

This invention is related to a multilayered polymeric film for labeling articles and is further related to an adhesive containing label stock and a label comprising the polymeric film. The film, label stock and label are especially useful with a hot melt adhesive.

BACKGROUND OF THE INVENTION

Hot melt adhesives provide a convenient and economical way to label articles of commerce such as glass, metal and plastic containers for consumer and industrial products. Hot melt adhesives are easy to handle in their solid form, generally have an indefinite shelf life, are environmentally friendly and cost effective since they do not involve solvents, and are able to quickly form adhesive bonds without any supplementary processing. One disadvantage of hot melt adhesives is their tendency to damage a label. Various relatively low molecular weight additives generally present in hot melt adhesives can migrate into a polymeric film of a label and result in staining, swelling and distortion of the label which detract from its function and appearance. This additive migration can also gradually result in the hot melt adhesive losing tack or adhesiveness especially at high service temperatures which can result in partial or complete detachment of the label. Hot melt adhesives can also cause thermal distortion of labels which lack heat resistance.

The polymeric film of the present invention minimizes or eliminates migration of hot melt adhesive additives and is heat resistant so that derivative labels are not damaged and remain attached to a container even at high service temperatures. The inventive polymeric film further provides the performance that is required to produce high quality labels including printability, die-cuttability, sufficient stiffness for dispensability, and conformability to an article or container.

SUMMARY OF THE INVENTION

The present invention involves a polymeric film for labeling articles that comprises (A) a core layer having an upper surface and a lower surface and comprising a polypropylene homopolymer, a polypropylene copolymer, a high density polyethylene, or a mixture of any of the foregoing polymers; (B) a print skin layer comprising a polypropylene homopolymer, a polypropylene copolymer, a high density polyethylene, or a mixture of any of the foregoing polymers and at least 10% by weight based on the weight of the layer (B) of a polyolefin elastomer, an alkene-unsaturated carboxylic acid or acid derivative copolymer, or a mixture of any of the foregoing polymers wherein the print skin layer overlies the upper surface of the core layer; and (C) an adhesive skin layer comprising a polypropylene homopolymer wherein the adhesive skin layer has an upper surface and a lower surface wherein the upper surface of the adhesive skin layer underlies the lower surface of the core layer; wherein the composition of layer (C) is different from the composition of layer (A), and the polymeric film is oriented.

In an embodiment of the invention, the core layer (A) of the polymeric film further comprises a polyolefin elastomer, an alkene-unsaturated carboxylic acid or acid derivative copolymer, or a mixture of any of the foregoing polymers.

In another embodiment of the invention, an adhesive containing label stock for use in adhesive labels comprises the above described polymeric film of this invention comprising layers (A), (B) and (C); (D) an adhesive layer having an upper and a lower surface wherein the upper surface of the adhesive layer is adhesively joined to the lower surface of layer (C); and (E) a release liner wherein the release liner is releasably adhered to the lower surface of the adhesive layer (D).

In a further embodiment of this invention an adhesive label is die-cut from the above described adhesive containing label stock comprising layers (A), (B), (C), (D) and (E).

DETAILED DESCRIPTION OF THE INVENTION

Figure 1:
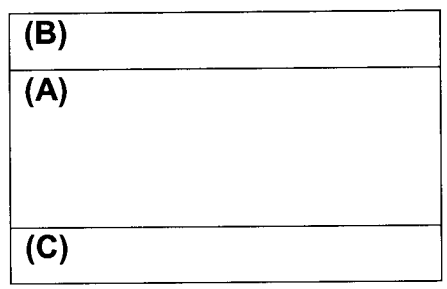
FIG. 1 is a cross sectional view of a polymeric film of the present invention.

The polymeric film of this invention comprises (A) a core layer having an upper surface and a lower surface, (B) a print skin layer that overlies the upper surface of the core layer (A), and (C) an adhesive skin layer that underlies the lower surface of the core layer (A). The terms overlie and underlie mean that the print skin layer and adhesive skin layer can be bonded to or in direct contact with the core layer or that one or more intermediate layers such as, for example, a tie layer can be between a skin layer and the core layer.

(A) Core Layer

The core layer (A) comprises a polypropylene homopolymer, a polypropylene copolymer, a high density polyethylene having a density of 0.94 g/cm$^3$ or higher, or a mixture of any of the foregoing polymers. A mixture as used throughout this application comprises two or more components of the same kind, or one or more components of the same kind and one or more components of one or more different kinds. For example the mixture of polymers in layer (A) can comprise two or more polypropylene homopolymers, two or more polypropylene copolymers, two or more high density polyethylenes, or one or more polypropylene homopolymers and/or one or more polypropylene copolymers and/or one or more high density polyethylenes. The polypropylene homopolymers and polypropylene copolymers and high density polyethylenes provide a rigid film for applications requiring a rigid film. Polypropylene homopolymers comprise thermoplastic polymers having a density of about 0.9 g/cm$^3$ and a melt index (also known as a melt flow rate) of about 0.5 to 40 g/10 minutes as measured by ASTM Standard D1238. Polypropylene homopolymers can be prepared from by polymerizing propylene monomer using either a Ziegler-Natta or metallocene catalyst, and are available from various resin suppliers including ExxonMobil, Huntsman and Dow Chemical. The polypropylene homopolymer can comprise a crystalline polypropylene homopolymer comprising an isotactic polypropylene homopolymer, a syndiotactic polypropylene homopolymer, or a mixture of any of the foregoing polypropylene homopolymers. The mixture of polypropylene homopolymers can be two or more isotactic polypropylene homopolymers, two or more syndiotactic polypropylene homopolymers, or one or more isotactic polypropylene homopolymers and one or more syndiotactic polypropylene homopolymers. Both isotactic and syndiotactic polypropylene homopolymers are highly crystalline having little or no solubility in toluene and having respectively melting points of about 150-175° C. and about 120-135° C. An isotactic polypropylene homopolymer can have an isotactic stereoregularity based on $^{13}C$ nuclear magnetic resonance (NMR) spectroscopy as described in U.S. Pat. No. 5,476,914 of greater than about 70%, 80% or 90%. A syndiotactic polypropylene homopolymer can have a syndiotactic stereoregularity based on $^{13}C$ NMR spectroscopy as described in U.S. Pat. No. 5,476,914 of greater than about 70%, 80% or 90%. An isotactic polypropylene homopolymer can be prepared from Ziegler-Natta or metallocene catalysts and is available from resin suppliers including ExxonMobil, Huntsman, BASF, Amoco, Chisso and Solvay. A useful polypropylene homopolymer is Huntsman P4G4K-173X, which is a nucleated polypropylene homopolymer having a density of 0.9 g/cm$^3$ and an ASTM D1238 melt index at 230° C./2.16 kg of 12 g/10 minutes. A syndiotactic polypropylene homopolymer, which is less crystalline than an isotactic polypropylene homopolymer, can be prepared with stereorigid metallocene catalysts as described in U.S. Pat. No. 5,476,914 and is available from resin supplier Atofina from the Finaplas® series of syndiotactic polypropylene homopolymers.

Polypropylene copolymers comprise thermoplastic polymers having a density of about or less than 0.9 g/cm$^3$, a melt index of about 0.5 to 40 g/10 minutes, and a high degree of crystallinity with a melting point of about 120 to 150° C. Polypropylene copolymers can be prepared by polymerizing propylene monomer and one or more alpha-olefin comonomers using catalysts such as Ziegler-Natta and metallocene catalysts. The alpha-olefin comonomers can comprise ethylene and alpha-olefins having 4 to 30 or 4 to 12 carbon atoms. The alpha-olefin comonomer content in polypropylene copolymers can range on a weight basis from 0.1 to 40%, 0.2 to 20%, 0.3 to 10%, or 1 to 7%. In an embodiment of the invention the polypropylene copolymer is a polypropylene random copolymer prepared from a Ziegler-Natta catalyst. In another embodiment of the invention the polypropylene random copolymer is a propylene-ethylene copolymer containing about 1 to 7% by weight of the ethylene comonomer. Polypropylene copolymers are available from various resin suppliers including ExxonMobil, Dow Chemical and Huntsman. A useful polypropylene copolymer is Huntsman P5M4K-070X, which is a nucleated polypropylene copolymer containing 3.2% by weight ethylene and having a density of 0.9 g/cm$^3$ and an ASTM D1238 melt index at 230° C./2.16 kg of 10 g/10 minutes.

High density polyethylenes are available from various resin suppliers including Dow Chemical and Atofina. Useful high density polyethylenes are Dow Chemical HDPE 12450N and HDPE 17450N which have respectively an ASTM D1238 melt index at 190° C./2.16 Kg of 12 and 17 g/10 minutes.

In an embodiment of the invention, the core layer (A) further comprises one or more additional thermoplastic polymers. The one or more thermoplastic polymers comprise other polyolefins, alkene-unsaturated carboxylic acid or acid derivative copolymers, styrene-based polymers or copolymers, polyurethanes, poly(vinyl chloride)s, polycarbonates, polyamides, fluoroplastics, poly(meth)acrylates, polyacrylonitriles, polyesters, or a mixture of any of the foregoing polymers.

In an embodiment of the invention, the core layer (A) further comprises a polyolefin elastomer, an alkene-unsaturated carboxylic acid or acid derivative copolymer, or a mixture of any of the foregoing polymers. The mixture can comprise two or more polyolefin elastomers, two or more alkene-unsaturated carboxylic acid or acid derivative copolymers, or one or more polyolefin elastomers and one or more alkene-unsaturated carboxylic acid or acid derivative copolymers. The polyolefin elastomers and alkene-unsaturated carboxylic acid or acid derivative copolymers in combination with the polypropylene and high density polyethylene polymers provide a more conformable film for applications requiring conformability.

The polyolefin elastomer comprises an elastomeric homopolymer or copolymer of $C_2$-$C_{30}$ olefin monomers or a mixture of any of the foregoing polyolefin elastomers. Polyolefin elastomers contain both hard or crystalline and soft or amorphous segments. Polyolefin elastomers are intermediate between thermoplastic polymers and vulcanized rubbers based on crystallinity and flexibility. Polyolefin elastomers are more crystalline and less flexible than vulcanized rubbers, and are typically less crystalline and lower melting and more flexible than thermoplastic polymers such as polypropylene homopolymers or copolymers which are highly crystalline. Polyolefin elastomers can have a density of about 0.84 to 0.935 g/cm$^3$, a melt index of about 0.5 to 40 g/10 minutes, a melting point of about 35 to 160° C., about 35 to 120° C., or about 40 to 110° C., and an ASTM D638 elongation at yield of greater than 40% or 60% or 130% or 200%. Polyolefin elastomers can generally be prepared by polymerizing an olefin monomer or a mixture of two or more different olefin monomers to form respectively a homopolymeric polyolefin elastomer or a copolymeric polyolefin elastomer also known as an olefin copolymer elastomer. Olefin monomers can comprise an alkene having a single double bond such as for example ethylene, an aliphatic polyene having two or more double bonds to include both conjugated and nonconjugated alkadienes such as, for example, 1,3-butadiene and 1,4-pentadiene, or mixtures of any of the foregoing olefin monomers. An alkene can comprise an internal alkene such as, for example, 2-butene, an alpha-olefin also known as a 1-alkene such as for example ethylene and propylene and 1-octene, or a mixture of any of the foregoing alkenes. Homopolymeric polyolefin elastomers can be prepared by polymerizing an olefin monomer, such as, for example, propylene, into blocks of isotactic polyolefin and blocks of atactic polyolefin to form a polyolefin elastomer chain. In an embodiment of the invention a polyolefin elastomer can comprise a low density polyethylene homopolymer prepared by free radical catalysis and having a density of 0.915 to 0.925 g/cm$^3$. Copolymeric polyolefin elastomers can be prepared by polymerizing an olefin monomer and one or more olefin comonomers using a metallocene catalyst where the olefin comonomer content of the elastomer can be on a mole % basis about 1.5-30%, 2-25%, 2.5-20%, or 5-20%. In embodiments of the invention, the olefin copolymer elastomer comprises two or more alpha-olefin monomers, or is prepared from two or more alpha-olefin monomers having 2-30, 2-20, 2-12, or 2-8 carbon atoms. In other embodiments of the invention the copolymeric polyolefin elastomer comprises an ethylenealpha-olefin copolymer elastomer such as, for example, an ethylene-alpha-olefin copolymer elastomer where the alpha-olefin can comprise 1-butene, 1-pentene, 4-methyl-1-pentene, 1-hexene, 1-octene, or a mixture of any of the foregoing alpha-olefins; a propylene-alpha-olefin copolymer elastomer; or a mixture of any of the foregoing copolymer elastomers. In an embodiment of the invention, the polyolefin elastomer comprises a medium density polyethylene, a linear low density polyethylene, a very low density polyethylene, a low density polyethylene prepared by free radical catalysis, a polyethylene plastomer, a polypropylene copolymer elastomer, or a mixture of any one of the foregoing polymers. Polyolefin elastomers are available from several resin suppliers and include the Exact® series and the Vistamaxx® series of elastomers from ExxonMobil and the Affinity® series and Versify® series of elastomers from Dow. Useful polyolefin elastomers include the ExxonMobil Exact® series of polyethylene plastomers which are prepared by polymerizing ethylene and a minor amount of 25 mole % or less of an alpha-olefin comonomer using a metallocene catalyst such as Exact® 8203 which has an octene comonomer and a density of 0.882 g/cm$^3$ and an ASTM D1238 melt index at 190° C./2.16 kg of 3 g/10 minutes. Useful polyolefin elastomers also include the Dow Chemical Versify® series of polypropylene copolymer elastomers which are prepared by polymerizing propylene with a minor amount of ethylene such as Versify® 3200 which has a density of 0.876 g/cm$^3$ and an ASTM D1238 melt index at 190° C./2.16 kg of 8 g/10 minutes.

In an embodiment of the invention, the alkene-unsaturated carboxylic acid or acid derivative copolymer comprises an alkene-unsaturated carboxylic acid copolymer, an alkene-unsaturated carboxylate ester copolymer, a metal salt of an alkene-unsaturated carboxylic acid copolymer, or a mixture of any of the foregoing copolymers. The alkene-unsaturated carboxylic acid or acid derivative copolymer can comprise a copolymer comprising an alkene monomer and an unsaturated carboxylic acid or acid derivative comonomer where the alkene-unsaturated carboxylic acid or acid derivative copolymer can be prepared from the alkene monomer and the unsaturated carboxylic acid or acid derivative comonomer. The alkene monomer can comprise an internal alkene such as 2-butene and/or an alpha-olefin such as ethylene, and can have 2 to 30 carbon atoms. The unsaturated carboxylic acid or acid derivative comonomer can comprise unsaturated carboxylic acids such as, for example, methacrylic acid and acrylic acid, unsaturated carboxylic acid esters such as, for example, vinyl acetate and ethyl acrylate and ethyl methacrylate, or a mixture of any of the foregoing comonomers. The comonomer can be present in the copolymer on a weight basis at 1-40%, 4-30%, or 6-25%. In several embodiments of the invention, the alkene-unsaturated carboxylic acid or acid derivative copolymer can comprise an ethylene-vinyl acetate copolymer, an ethylene-alkyl (meth)acrylate copolymer, an ethylene-(meth) acrylic acid copolymer, a metal salt of an ethylene-(meth) acrylic acid copolymer (also known as an ionomer), and a mixture of any of the foregoing copolymers. Alkene-unsaturated carboxylic acid or acid derivative copolymers can have a density of 0.91-0.96 g/cm$^3$, a melt index of 0.5 to 40 g/10 minutes, a melting point of 35-160° C. or 35-120° C. or 40-110° C., and are available from resin suppliers including AT Plastics and DuPont. Useful alkene-unsaturated carboxylic acid or acid derivative copolymers include A. T. Plastics Ateva® series of ethylene-vinyl acetate copolymers such as Ateva® 1231 which contains 12 wt. % vinyl acetate and has a density of 0.932 g/cm$^3$ and an ASTM D1238 melt index at 190° C./2.16 kg of 3 g/10 minutes and Ateva® 1821 which contains 18 wt. % vinyl acetate and has a density of 0.938 g/cm$^3$ and an ASTM D1238 melt index at 190° C./2.16 kg of 3 g/10 minutes. The DuPont Surlyn® series of ionomer resins which are metal salts of ethylene-methacrylic acid copolymers such as Surlyn® 1601 which is a sodium salt are also useful.

In an embodiment of the invention, the amount of the polyolefin elastomers and alkene-unsaturated carboxylic acid or acid derivative copolymers present in the core layer (A) based on the weight of the core layer (A) can be at least 10%, 10 to 50%, 10 to 40%, or 10 to 30% by weight. In an embodiment of the invention, the amount of the polypropylene homopolymers and polypropylene copolymers and high density polyethylenes present in the core layer (A) based on the weight of the core layer (A) can be up to 90%, 50 to 90%, 60 to 90%, or 70 to 90% by weight. The presence of a polyolefin elastomer and/or alkene-unsaturated carboxylic acid or acid derivative copolymer in the core and/or print skin layers of the polymeric film can improve performance of the polymeric film in terms of increasing tear resistance, impact resistance, conformability to a container, and printability of a derivative label.

In an embodiment of the invention, the core layer (A) further comprises one or more additives as described in U.S. Pat. No. 6,821,592. The one or more additives comprise a nucleating agent, an antiblock agent, a processing aid, a slip agent, an antistatic agent, a pigment, a cavitating agent, an inorganic filler, an antioxidant, or a mixture of any of the foregoing additives. The additives can be introduced into the film or a layer of the film as part of commercially available resins supplied by resin manufacturers where the resin comprises at least one thermoplastic polymer and one or more additives. Alternatively, the additives can be introduced into the film or a layer of the film as part of commercially available additive concentrates supplied by additive concentrate manufacturers where the additive concentrate comprises one or more additives in a thermoplastic polymer matrix or carrier. The nucleating agent can comprise an inorganic or mineral nucleating agent such as, for example, a silica, an organic nucleating agent such as a metal salt of a carboxylic acid or a beta-nucleating agent, or a mixture of any of the foregoing nucleating agents. The nucleating agent can be present in one or more layers of the polymeric film of this invention at a range of 100 to 10,000 or 200 to 5,000 or 300 to 1,000 ppm (parts per million) by weight based on the weight of the layer. The nucleating agent is generally introduced into a layer of the film as part of a thermoplastic polymer as obtained from a resin supplier. In several embodiments of the invention, a nucleating agent is present in one layer of the film which can comprise the core layer or one of the skin layers, or is present in any combination of two or more layers of the film. The antiblock agent can comprise a concentrate of about 3 to 80% by weight of an inorganic mineral in a thermoplastic polymer matrix such as for example 5% by weight of an amorphous silica in a polyolefin matrix. The antiblock agent can be present in one or more layers of the polymeric film of this invention at a range of about 100 to 10,000 or 200 to 5,000 or 300 to 1,000 ppm by weight based on the weight of the layer. Antiblock agents as well as slip agents, processing aids and antistatic agents provide improvement in performance to a film and derivative label due to surface properties. Consequently when present in the film, these additives are generally present in one or both of the skin layers. The pigment can comprise an inorganic pigment comprising titanium dioxide, calcium carbonate, talc, an iron oxide, a carbon black, or a mixture of any of the foregoing inorganic pigments; an organic pigment; or a mixture of any of the foregoing pigments. The pigment can comprise a concentrate of about 20 to 80% by weight of an inorganic pigment and/or organic pigment in a thermoplastic matrix. The pigment concentrate can be present in one or more layers of the polymeric film of this invention at a range of about 0.5 to 20% by weight based on the weight of the layer to provide color to and/or opacify the film. An opaque film will generally have an opacity of at least 70%, at least 75%, or at least 80%. The pigment concentrate is generally in the core layer when present in the film.

(B) Print Skin Layer

The print skin layer (B) comprises a polypropylene homopolymer, a polypropylene copolymer, a high density polyethylene, or a mixture of any of the foregoing polymers and at least 10% by weight based on the weight of the layer (B) of a polyolefin elastomer, an alkene-unsaturated carboxylic acid or acid derivative copolymer, or a mixture of any of the foregoing polymers. The polymers of the print skin layer are described hereinabove for the core layer (A). The polyolefin elastomers and alkene-unsaturated carboxylic acid or acid derivative copolymers when present in the print skin layer improve performance of the polymeric film to include the printability of a derivative label. The composition of the print skin layer (B) is different from the composition of the core layer (A) because the print skin layer and the core layer provide different functions and performance for the film.

In several embodiments of the invention, the print skin layer (B) comprises, based on the weight of the print skin layer, at least 10%, 10 to 50%, 10 to 40%, or 10 to 30% by weight of a polyolefin elastomer, an alkene-unsaturated carboxylic acid or acid derivative copolymer, or a mixture of any of the foregoing polymers. In several embodiments of the invention the print skin layer (B) comprises, based on the weight of the print skin layer, up to 90%, 50 to 90%, 60 to 90%, or 70 to 90% by weight of a polypropylene homopolymer, a polypropylene copolymer, a high density polyethylene, or a mixture of any of the foregoing polymers.

In an embodiment of the invention, the print skin layer (B) further comprises one or more additional thermoplastic polymers as described hereinabove for the core layer (A).

In an embodiment of the invention, the print skin layer (B) further comprises one or more additives or additive concentrates as described hereinabove for the core layer (A). In another embodiment of the invention the print skin layer comprises a nucleating agent, an antiblock agent, a processing aid, a slip agent, an antistatic agent, an antioxidant or a mixture of any of the foregoing additives.

(C) Adhesive Skin Layer

The adhesive skin layer (C) comprises a polypropylene homopolymer wherein the composition of the adhesive skin layer (C) is different from the composition of the core layer (A). Because the adhesive skin layer and the core layer provide different functions and performance for the film, the composition of the adhesive skin layer is different from the composition of the core layer. The composition of layer (C) can be different from the composition of layer (A) based on (i) the type and/or amount of polypropylene polymer, (ii) the type and/or amount of one or more additional thermoplastic polymers and/or polyolefin elastomers and/or alkene-unsaturated carboxylic acid or acid derivative copolymers as described hereinabove for the core layer (A), (iii) the type and/or amount of one or more additives as described hereinabove for core layer (A), or (iv) a combination of any of the foregoing conditions (i)-(iii). A function of the adhesive skin layer is to provide a surface for an adhesive layer to be adhesively joined to the surface of the adhesive skin layer wherein the adhesive layer comprises an adhesive as described hereinbelow for the adhesive label stock. In an embodiment of the invention the adhesive skin layer provides a surface for an adhesive layer to be adhesively joined to the surface of the adhesive skin layer wherein the adhesive layer comprises a hot melt adhesive and the adhesive skin layer eliminates or minimizes thermal distortion and migration of additives or components of the hot melt adhesive so that the inventive film and a derivative label from the film are not damaged or reduced in performance.

The polypropylene homopolymer of layer (C) comprises the polypropylene homopolymer as described hereinabove for the core layer (A). In an embodiment of the invention, the polypropylene homopolymer of layer (C) comprises an isotactic polypropylene homopolymer, a syndiotactic polypropylene homopolymer, or a mixture of any of the foregoing polypropylene homopolymers. In another embodiment of the invention the isotactic polypropylene homopolymer has an isotactic stereoregularity of greater than 70%, 80%, 90%, or 95%. In another embodiment of the invention the syndiotactic polypropylene homopolymer has an syndiotactic stereoregularity of greater than 70%, 80%, 90%, or 95%. In an embodiment of the invention the adhesive skin layer (C) comprises on a weight basis at least 70%, 80%, 90%, or 95% of a polypropylene homopolymer. In embodiments of the invention, layer (C) consists essentially of a polypropylene copolymer and at least 70% by weight of a polypropylene homopolymer or of a polypropylene copolymer, at least 70% by weight of a polypropylene homopolymer, and at least one additive or additive concentrate where the additives and additive concentrates are described hereinabove for the core layer (A) and hereinbelow for adhesive skin layer (C). In other embodiments of the invention, layer (C) consists essentially of a polypropylene copolymer and at least 80% by weight of a polypropylene homopolymer or of a polypropylene copolymer, at least 80% by weight of a polypropylene homopolymer, and at least one additive or additive concentrate. In embodiments of the invention layer (C) consists essentially of at least one polypropylene homopolymer or of at least one polypropylene homopolymer and at least one additive or additive concentrate. In several embodiments of the invention, the polypropylene copolymer has on a weight basis a comonomer content of less than 10%, less than 6%, less than 4%, or less than 2% wherein the comonomer is an olefin other than propylene.

In an embodiment of the invention, the adhesive skin layer (C) further comprises one or more additional thermoplastic polymers as described hereinabove for the core layer (A).

In an embodiment of the invention, the adhesive skin layer (C) further comprises one or more additives or additive concentrates as described above for the core layer (A). In an embodiment of the invention the adhesive skin layer (C) comprises an antiblock agent, a slip agent, a processing aid, an antistatic agent, a nucleating agent, an antioxidant, or a mixture of any of the foregoing additives. In another embodiment of the invention the adhesive layer (C) comprises at least one additive or additive concentrate wherein the additive or additive concentrate does not comprise a cavitating agent.

Film Construction and Processing

The layers of the multilayered polymeric film of the present invention can be prepared by steps comprising extrusion of a layer from a linear or annular die, coextrusion of two or more layers from a linear or annular die, lamination of two or more previously formed layers, coating of one or more layers onto a previously formed monolayer or multilayer construction, or any combination of the foregoing steps. In an embodiment of the invention, the film is prepared by coextrusion from a linear die.

The polymeric film can subsequently be oriented by stretching it biaxially in the machine direction (direction the film is advanced during film manufacture) and in the transverse direction (direction normal or perpendicular to the machine direction) or by stretching it uniaxially in the machine direction or in the transverse direction. Generally the film is oriented by hot stretching it several times its length and/or width and then annealing it where hot stretching and annealing are done at or near the softening temperature of the film or from 90 to 175° C. In several embodiments of the invention, the film is oriented by stretching the film from 2 to 12 times, 2 to 10 times, 2 to 9 times, 3 to 9 times, or 4 to 6 times in the machine direction or in both the machine and transverse directions. In embodiments of the invention the film is oriented by stretching the film from 2 to 12 times, 2 to 10 times, 2 to 9 times, 3 to 9 times, or 4 to 6 times in the machine direction only. The oriented film can then be heat set or annealed to provide dimensional stability to the film to prevent or minimize shrinking or distortion when exposed to elevated service application temperatures during processing to form a derivative label and in subsequent label service. Coextrusion, orientation and annealing procedures which can be used to manufacture a film are described in US Patent Application Publication No. US2004/0033349.

Orienting a film in the machine direction only generally increases the tensile modulus or stiffness in the machine direction. This increased machine direction stiffness provides a label, prepared from the film, with sufficient stiffness for proper dispensability and good print registration in the labeling of articles. This film, oriented in the machine direction only, generally has a substantially lower tensile modulus or stiffness in the transverse direction (TD) compared to the machine direction (MD) which provides a derivative label with sufficient flexibility for good conformability to the surface of an article to be labeled. In embodiments of the invention the TD to MD tensile modulus ratio is less than 0.75, 0.65, or 0.6.

The film following manufacture, which can comprise for example coextrusion or coextrusion and orientation or coextrusion and orientation and annealing, can have a total thickness ranging from 0.5-10 mils (12.7-254 micrometers), 1-7 mils (25.4-177.8 micrometers), or 1.5-4 mils (38.1-101.6 micrometers). The core layer (A) of the inventive film is generally a thicker layer compared to the skin layers (B) and (C) or to any tie layers that might be present in the film. The thickness of the core layer (A) can be greater than 50%, 65 to 98%, 70 to 98% or 85 to 96% of the thickness of the film. The thickness of the skin layer (B) can be the same as or different from the thickness of the skin layer (C). The thickness of the skin layers (B) and (C) can independently be less than 50%, less than 40%, 1 to 30%, 1 to 15%, 1 to 10%, or 2 to 5% of the thickness of the film. A tie layer can be present in the film between the core layer (A) and one or both of skin layers (B) and (C) to improve adhesion or bonding of the skin layer or skin layers to the core layer. The tie layer can comprise any polymers, including thermoplastic polymers or polyolefin elastomers or mixtures of any of the foregoing polymers, as described hereinabove for the core layer (A) and throughout this application that improves adhesion, and can comprise a blend of a polyolefin and an alkene-unsaturated carboxylic acid or acid derivative copolymer and/or polyolefin elastomer such as for example a blend of a polypropylene homopolymer or copolymer and an ethylene-vinyl acetate copolymer. The thickness of tie layers is generally the same as the thickness of the skin layers. The composition of any tie layer lying between a skin layer and the core layer is different from the composition of the core layer and said skin layer since each of these layers provides different functions and performance for the film.

In embodiments of the invention each of the thermoplastic polypropylene homopolymers and/or copolymers present in the layers of the film can independently have a melt flow rate in g/10 minutes as measured by ASTM Standard D1238 of at least 4, 4 to 35, 6 to 30, at least 8, or 8 to 25 at 230° C./2.16 Kg. Labels derived from a film comprising high melt flow rate (at least 4 or at least 8 g/10 minutes) polypropylene homopolymers and/or copolymers generally have improved die-cuttability.

The film of the present invention comprises a print skin layer (B) which comprises at least 10% by weight of a polyolefin elastomer, an alkene-unsaturated carboxylic acid or acid derivative copolymer, or mixture of any of the foregoing polymers in the print skin layer based on the weight of the print skin layer. The polyolefin elastomers and alkene-unsaturated carboxylic acid or acid derivative copolymers can improve printability and/or allow for improving printability in terms of ink adhesion to a label derived from the film. The film can also be treated on the surface of the print skin layer (B) or on the surfaces of both skin layers to further improve adhesion of an ink or an adhesive layer to a skin layer. Surface treatments comprise corona discharge treatment, flame treatment, plasma treatment, coating with an ink- or adhesive-receptive material such as an acrylic coating, or a combination of any of the foregoing treatments.

In several embodiments of the invention a core layer (A) comprises a polypropylene homopolymer, a polypropylene copolymer, a high density polyethylene, or a mixture of any of the foregoing polymers, and the print skin layer (B) comprises a polypropylene homopolymer, a polypropylene copolymer, a high density polyethylene, or a mixture of any of the foregoing polymers and at least 10% by weight based on the weight of the layer (B) of a polyolefin elastomer, an alkene-unsaturated carboxylic acid or acid derivative copolymer, or a mixture of any of the foregoing polymers. In several more embodiments of this invention a core layer (A) comprises a polypropylene homopolymer, a polypropylene copolymer, a high density polyethylene or a mixture of any of the foregoing polymers and a polyolefin elastomer, an alkene-unsaturated carboxylic acid or acid derivative copolymer, or a mixture of any of the foregoing polymers, and the print skin layer (B) comprises a polypropylene homopolymer, a polypropylene copolymer, a high density polyethylene, or a mixture of any of the foregoing polymers and at least 10% by weight based on the weight of the layer (B) of a polyolefin elastomer, an alkene-unsaturated carboxylic acid or acid derivative copolymer, or a mixture of any of the foregoing polymers.

FIG. 1 illustrates a polymeric film of the present invention in which relatively thin skin layers (B) and (C) respectively overlie and underlie a relatively thick core layer (A).

Adhesive Label Stock and Adhesive Label Construction

Figure 2:
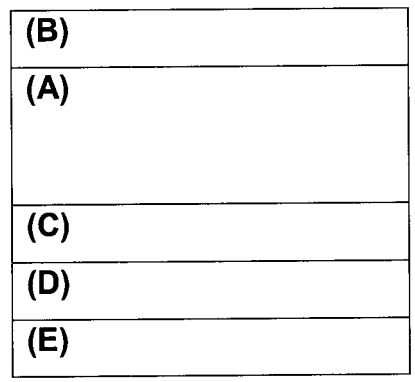
FIG. 2 is a cross sectional view of an adhesive containing label stock of the present invention.

The polymeric film of the present invention comprises a multilayered film that is used with an adhesive layer to label an article. The article can be any shaped container to include a bottle, a jug, a jar or a drum. The article can be made of paper, cardboard, glass, metal, plastic, or a mixture thereof. The article can be any shaped container used for packaging a consumer or industrial product. In an embodiment of the invention the film comprising layers (A), (B) and (C) further comprises an adhesive layer (D) having an upper and a lower surface wherein the upper surface of the adhesive layer is adhesively joined to the lower surface of the adhesive skin layer (C). In another embodiment of the invention the adhesive layer comprises an adhesive as described hereinbelow. The polymeric film is generally converted to an adhesive containing label stock and then to an adhesive label which is used to label an article. The polymeric film can be converted to an adhesive containing label stock by initially slitting the film into widths suitable for labeling articles. The slit film is then combined with an adhesive layer and a release liner to form an adhesive containing label stock as illustrated in FIG. 2. The adhesive layer can be combined with the release liner initially, the slit polymeric film initially, or with both liner and film simultaneously. In FIG. 2, an adhesive layer (D) has an upper and a lower surface where the upper surface of the adhesive layer (D) is adhesively joined to the lower surface of the adhesive skin layer (C) of the polymeric film comprising layers (A), (B) and (C), and a release liner (E) is releasably adhered to the lower surface of the adhesive layer (D). The release liner can comprise a monolayered or multilayered film where the film of the liner can comprise a paper film, a polymeric film such as for example a polyolefin film, or a mixture of any of the foregoing films. The release liner normally comprises a release coating on the film of the release liner such as for example an organosiloxane polymer, which is also known as a silicone, so that the release liner can later be removed from the adhesive layer during the labeling process. The adhesive layer comprises an adhesive that comprises one or more thermoplastic polymers to include one or more elastomeric polymers. In an embodiment of the invention, the adhesive layer comprises a pressure sensitive adhesive. In embodiments of the invention the adhesive layer comprises a pressure sensitive adhesive which comprises a solvent adhesive, an emulsion adhesive, or a hot melt adhesive.

Pressure sensitive hot melt adhesives generally comprise elastomeric polymers which comprise natural rubbers and/or synthetic polymers and additional components such as for example tackifiers as described in U.S. Pat. No. 6,214,935. The hot melt adhesive comprises an alkene-unsaturated carboxylic acid ester copolymer such as for example ethylene-vinyl acetate copolymers and ethylene-ethyl acrylate copolymers, a styrene polymer and/or copolymer and/or block copolymer such as, for example, styrene-isoprene-styrene block copolymers and styrene-butadiene-styrene block copolymers, a polyolefin, a polyamide, a polyester, a polyurethane such as for example reactive polyurethanes, and a mixture of any of the foregoing polymers. The hot melt adhesive further comprises tackifiers, plasticizers, waxes, performance additives including antioxidants and photoinitiators and fillers and reinforcing agents and compatibilizers and nucleating agents and mixtures of any of the foregoing additives, and mixtures of any of the foregoing components. In an embodiment of the invention, the adhesive layer comprises a hot melt adhesive which comprises a styrene block copolymer.

The adhesive containing label stock is typically converted to an adhesive label by initially printing the label stock using any printing means such as, for example, offset lithography with a suitable printing ink to include for example water-based inks and solvent-based inks and UV-activated inks. Alternatively, the slit film can be printed prior to combining with the hot melt adhesive and release liner. The printed label stock is then die-cut into a series of individual adhesive labels that can be used to label articles of commerce in a labeling operation. In the labeling operation, a series of die-cut adhesive labels can be peeled away one by one from a matrix of the polymeric film bordering the die-cut label and the underlying release liner.

EXAMPLES

The following nonlimiting examples further describe and illustrate the present invention.

Example 1

A 2.5 mil (63.5 micrometers) film is prepared by coextrusion, orientation by stretching in the machine direction 5.3 times, annealing, and corona discharge treatment of the print skin layer. Core layer (A) is 92% of film thickness and comprises on a wt. basis 100% polypropylene copolymer. Print skin layer (B) is 4% of film thickness and comprises on a wt. basis 88% polypropylene copolymer, 10% polyethylene plastomer, and 2% antiblock agent. Adhesive skin layer (C) is 4% of film thickness and comprises on a wt. basis 98% polypropylene homopolymer and 2% antiblock agent.

Example 2

A 2 mil (50.8 micrometers) film is prepared as in Example 1. Core layer (A) is 80% of film thickness and comprises on wt. basis 90% polypropylene homopolymer and 10% polyethylene plastomer. Print skin layer (B) is 9% of film thickness and comprises on wt. basis 89% polypropylene homopolymer, 10% polyethylene plastomer and 1% antiblock agent. Adhesive skin layer (C) is 11% of film thickness and comprises on wt. basis 98% polypropylene homopolymer and 2% antiblock agent.

Example 3

A 2.5 mil (63.5 micrometers) film is prepared as in Example 1. Core layer (A) is 74% of film thickness and comprises on wt. basis 90% polypropylene copolymer and 10% polyethylene plastomer. Print skin layer (B) is 11% of film thickness and comprises on wt. basis 61% polypropylene copolymer, 36% polyethylene elastomer and 3% antiblock agent. Adhesive skin layer (C) is 15% of film thickness and comprises on wt. basis 98% polypropylene homopolymer and 2% antiblock agent.

Example 4

A 2 mil (50.8 micrometers) film is prepared as in Example 1. Core layer (A) is 80% of film thickness and comprises on wt. basis 90% polypropylene copolymer and 10% polyethylene plastomer. Print skin layer (B) is 9% of film thickness and comprises on wt. basis 89% polypropylene copolymer, 10% polyethylene plastomer, and 1% antiblock agent. Adhesive skin layer (C) is 11% of film thickness and comprises on wt. basis 98% polypropylene homopolymer and 2% antiblock agent.

Example 5

A 2.5 mil (63.5 micrometers) film is prepared as in Example 1. Core layer (A) is 92% of film thickness and comprises on wt. basis 100% polypropylene copolymer. Print skin layer (B) is 4% of film thickness and comprises on wt. basis 88% polypropylene copolymer, 10% polyethylene plastomer, and 2% antiblock agent. Adhesive skin layer (C)

is 4% of film thickness and comprises on wt. basis 98% polypropylene homopolymer and 2% antiblock agent.

Example 6

A 2 mil (50.8 micrometers) film is prepared as in Example 1. Core layer (A) is 74% of film thickness and comprises on wt. basis 90% polypropylene copolymer and 10% polyethylene plastomer. Print skin layer (B) is 11% of film thickness and comprises on wt. basis 61% polypropylene homopolymer, 36% polyethylene plastomer, and 3% antiblock agent. Adhesive skin layer (C) is 15% of film thickness and comprises on wt. basis 83% polypropylene homopolymer, 15% polypropylene copolymer and 2% antiblock agent.

Example 7

A 2 mil (50.8 micrometers) film is prepared as in Example 1. Core layer (A) is 78% of film thickness and comprises on wt. basis 90% polypropylene copolymer and 10% polyethylene plastomer. Print skin layer (B) is 12% of film thickness and comprises on wt. basis 88% polypropylene copolymer, 10% polyethylene plastomer, and 2% antiblock agent. Adhesive skin layer (C) is 10% of film thickness and comprises on wt. basis 78% polypropylene homopolymer, 20% polypropylene copolymer and 2% antiblock agent.

Example 8

A 2.5 mil (63.5 micrometers) film is prepared as in Example 1. Core layer (A) is 77% of film thickness and comprises on wt. basis 100% polypropylene homopolymer. Print skin layer (B) is 15% of film thickness and comprises on wt. basis 88% polypropylene copolymer, 10% linear low density polyethylene, and 2% antiblock agent. Adhesive skin layer (C) is 8% of film thickness and comprises on wt. basis 93% polypropylene homopolymer, 5% polypropylene copolymer and 2% antiblock agent.

Examples 9-20 are monolayered adhesive skin films that are prepared on a pilot line by extrusion, orientation by stretching 5 times in the machine direction, and annealing. The films of Examples 9-20 are evaluated for hot melt adhesive performance in terms of resistance to swelling and distortion by using mineral oil, which mimics additive migration of hot melt adhesives. Table I lists the hot melt adhesive performance for the films of Examples 9-20.

TABLE I

| Example No. | Composition[a] | Rating @ 16 Hours[b] | Rating @ 42 Hours[b] |
|---|---|---|---|
| 9 | 80% RCP[1] + 20% HPP[1] | 1 | 4 |
| 10 | 50% RCP[1] + 50% HPP[1] | 1 | 2 |
| 11 | 20% RCP[1] + 80% HPP[1] | 1 | 1 |
| 12 | 100% HPP[1] | 1 | 1 |
| 13 | 100% RCP[1] | 1 | 4 |
| 14 | 50% GMAH[1] + 48% RCP[2] + 2% AB | 5 | 5 |
| 15 | 98% GMAH[1] + 2% AB | 5 | 5 |
| 16 | 68% RCP[2] + 30% PT + 2% AB | 1 | 5 |
| 17 | 77% GMAH[1] + 21% HPP[2] + 2% AB | 1 | 4 |
| 18 | 40% GMAH[2] + 55% HPP[2] + 5% AB | 2 | 4 |
| 19 | 15% GMAH[3] + 80% HPP[2] + 5% AB | 1 | 3 |
| 20 | 95% GAA + 5% AB | 2 | 3 |

[a]Composition is on a weight basis.
RCP[1] is BaselI XL451J polypropylene random copolymer having melt flow rate (MFR) of 3.9.
HPP[1] is BaselI SR257M polypropylene homopolymer having MFR of 2.0.
GMAH[1] is Mitsui Admer QF551A polypropylene homopolymer grafted with 0.5% maleic anhydride and having MFR of 5.7.

TABLE I-continued

| Example No. | Composition[a] | Rating @ 16 Hours[b] | Rating @ 42 Hours[b] |
|---|---|---|---|

RCP[2] is Huntsman P5M4K-072X nucleated polypropylene random copolymer having MFR of 10.0.
AB is Ampacet 401960 antiblock agent which contains 3% poly(methyl methacrylate) in polypropylene homopolymer carrier and has MFR of 7.2.
PT is ExxonMobil Exxelor PA609A polyterpene rosin in polypropylene homopolymer carrier.
HPP[2] is Huntsman P4C4K-173X nucleated polypropylene homopolymer having MFR of 12.0.
GMAH[2] is Chemtura Polybond 3150 polypropylene homopolymer grafted with 0.5% maleic anhydride and having MFR of 50.0.
GMAH[3] is Chemtura Polybond 3200 polypropylene homopolymer grafted with 1.0% maleic anhydride and having MFR of 115.
GAA is Chemtura Polybond 1001 polypropylene homopolymer grafted with 6% acrylic acid and having a MFR of 40.0.
[b]The rating scale for film distortion due to additive migration using mineral oil is as follows: 1 = flat (no discernable warpage), 2 = low warpage, 3 = medium warpage, 4 = high warpage, 5 = curled.

Each of the documents referred to in the Detailed Description is incorporated herein by reference. All numerical quantities in this application used in the Detailed Description and appended Claims are understood to be modified by the word "about" except in examples and where explicitly indicated otherwise. All range and ratio limits in the Detailed Description and appended Claims are combinable.

While the invention has been presented in the Detailed Description and appended Claims, it is understood that various modifications of this invention will become apparent to those skilled in the art upon reading this application. Therefore these various modifications, that fall within the scope of the appended Claims and/or Detailed Description, are considered to be a part of this invention.

What is claimed is:

1. A polymeric film for labeling articles, comprising:
(A) a core layer having an upper surface and a lower surface and comprising up to 90% by weight of a propylene homopolymer, a propylene copolymer, a high density polyethylene, or a mixture of any of the foregoing polymers;
(B) a print skin layer comprising a propylene homopolymer, a propylene copolymer, a high density polyethylene, or a mixture of any of the foregoing polymers and from 10% to 40% by weight based on the weight of layer (B) of a metal salt of an alkene-unsaturated carboxylic acid or acid derivative copolymer or a mixture thereof, wherein the print skin layer overlies the upper surface of the core layer;
(C) an adhesive skin layer comprising at least 90% by weight propylene homopolymer, wherein the adhesive skin layer has an upper surface and a lower surface wherein the upper surface of the adhesive skin layer underlies the lower surface of the core layer; and
(D) an adhesive layer having an upper and a lower surface, wherein the upper surface of the adhesive layer is adhesively joined to the lower surface of layer (C), wherein the adhesive layer is a hot melt adhesive,
wherein the composition of layer (C) is different from the composition of layer (A),
wherein the polymeric film has been oriented by uniaxial stretching in a machine direction, and
wherein the propylene homopolymer of layer (C) consists of an isotactic propylene homopolymer having an isotactic stereoregularity greater than 90%.

2. The polymeric film of claim 1, wherein the adhesive skin layer comprises at least 95% by weight polypropylene homopolymer.

3. The polymeric film of claim 1, wherein the print skin layer comprises 60% to 90% by weight of the polypropylene homopolymer, the polypropylene copolymer, the high density polyethylene, or the mixture of any of the foregoing polymers based on the weight of the layer (B).

4. The polymeric film of claim 1, wherein the print skin layer comprises 10% to 30% by weight of the metal salt of an alkene-unsaturated carboxylic acid or acid derivative copolymer or a mixture thereof based on the weight of the layer (B).

5. The polymeric film of claim 4, wherein the print skin layer comprises 70% to 90% by weight of the polypropylene homopolymer, the polypropylene copolymer, the high density polyethylene, or the mixture of any of the foregoing polymers based on the weight of the layer (B).

6. The film of claim 1, wherein the metal salt of an alkene-unsaturated carboxylic acid copolymer is a metal salt of an ethylene-(meth)acrylic acid copolymer.

7. The film of claim 1 wherein layer (A) further comprises a polyolefin elastomer, an alkene-unsaturated carboxylic acid or acid derivative copolymer, or a mixture of any of the foregoing polymers.

8. The film of claim 1 wherein layer (A) further comprises a polyolefin elastomer, wherein the polyolefin elastomer comprises a linear low density polyethylene, a very low density polyethylene, a polyethylene plastomer, a polypropylene copolymer elastomer, or a mixture of anyone of the foregoing polymers.

9. The polymeric film of claim 7, wherein the core layer (A) comprises from 10% to 50% by weight based on the weight of the layer (A) of a polyolefin elastomer, an alkene-unsaturated carboxylic acid or acid derivative copolymer, or a mixture thereof.

10. The film of claim 1 wherein the core layer (A) comprises up to 90% by weight of a polypropylene homopolymer, a polypropylene copolymer, or a mixture of any of the foregoing polymers.

11. A polymeric film for labeling articles, comprising:
(A) a core layer having an upper surface and a lower surface and comprising up to 90% by weight of a propylene homopolymer, a propylene copolymer, or a mixture of any of the foregoing polymers;
(B) a print skin layer comprising a propylene homopolymer, a propylene copolymer, or a mixture of any of the foregoing polymers and at least 10% by weight based on the weight of layer (B) of a polyolefin elastomer, an alkene-unsaturated carboxylic acid or acid derivative copolymer or a mixture of any of the foregoing polymers, wherein the alkene-unsaturated carboxylic acid or acid derivative copolymer is a metal salt of an alkene-unsaturated carboxylic acid copolymer, wherein the print skin layer overlies the upper surface of the core layer; and
(C) an adhesive skin layer comprising at least 90% by weight propylene homopolymer, wherein the adhesive skin layer has an upper surface and a lower surface wherein the upper surface of the adhesive skin layer underlies the lower surface of the core layer,
wherein the composition of layer (C) is different from the composition of layer (A),
wherein layer (A) further comprises a polyolefin elastomer,
wherein the polymeric film has been oriented by uniaxial stretching in a machine direction, and
wherein the propylene homopolymer of layer (C) consists of an isotactic propylene homopolymer having an isotactic stereoregularity greater than 90%.

12. The polymeric film of claim 11, further comprising an adhesive layer having an upper and a lower surface wherein the upper surface of the adhesive layer is adhesively joined to the lower surface of layer (C), wherein the adhesive layer is a hot melt adhesive.

13. The film of claim 11 wherein the metal salt of an alkene-unsaturated carboxylic acid copolymer is a metal salt of an ethylene-(meth)acrylic acid copolymer.

14. The polymeric film of claim 11, wherein the polyolefin elastomer of the print skin layer (B) comprises a linear low density polyethylene, a very low density polyethylene, a polyethylene plastomer, a polypropylene copolymer elastomer, or a mixture of anyone of the foregoing polymers.

15. The polymeric film of claim 11, wherein the core layer (A) comprises from 10% to 50% by weight based on the weight of layer (A) of the polyolefin elastomer.

16. The film of claim 11 wherein the polyolefin elastomer of layer (A) comprises a linear low density polyethylene, a very low density polyethylene, a polyethylene plastomer, a polypropylene copolymer elastomer, or a mixture of anyone of the foregoing polymers.

17. The film of claim 1 wherein the layer (C) further comprises a nucleating agent, an antiblock agent, a processing aid, a slip agent, an antistatic agent, an antioxidant or a mixture of any of the foregoing additives.

18. The film of claim 1 wherein layer (A) or layers (A) and (B) comprise a nucleating agent.

19. The film of claim 1 wherein the thickness of layer (C) is 1% to 30% of the thickness of the polymeric film.

20. The film of claim 1 or 11 wherein the uniaxial stretching comprises stretching the film from 2 to 12 times in the machine direction.

21. An adhesive containing label stock for use in adhesive labels, comprising:
the film of claim 1;
and
(E) a release liner wherein the release liner is releasably adhered to the lower surface of the adhesive layer (D).

22. An adhesive label die-cut from the label stock of claim 21.

23. A polymeric film for labeling articles, comprising:
(A) a core layer having an upper surface and a lower surface and comprising up to 90% by weight of a propylene homopolymer, a propylene copolymer, or a mixture of any of the foregoing polymers;
(B) a print skin layer comprising a propylene homopolymer, a propylene copolymer, or a mixture of any of the foregoing polymers and at least 10% by weight based on the weight of layer (B) of a polyolefin elastomer, wherein the print skin layer overlies the upper surface of the core layer;
(C) an adhesive skin layer comprising at least 90% by weight propylene homopolymer, wherein the adhesive skin layer has an upper surface and a lower surface wherein the upper surface of the adhesive skin layer underlies the lower surface of the core layer; and
(D) an adhesive layer having an upper and a lower surface, wherein the upper surface of the adhesive layer is adhesively joined to the lower surface of layer (C), wherein the adhesive layer is a hot melt adhesive,
wherein the composition of layer (C) is different from the composition of layer (A),
wherein layer (A) further comprises a polyolefin elastomer,
wherein the polymeric film has been oriented by uniaxial stretching in a machine direction,
wherein the propylene homopolymer of layer (C) consists of an isotactic propylene homopolymer having an isotactic stereoregularity greater than 90%, and wherein the polyolefin elastomer of layer (A) or layer (B) comprises a linear low density polyethylene, a very low density polyethylene, a polyethylene plastomer, a propylene copolymer elastomer, or a mixture of any of the foregoing polymers.

\* \* \* \* \*